(12) United States Patent
Gopalarathnam et al.

(10) Patent No.: US 9,819,575 B2
(45) Date of Patent: Nov. 14, 2017

(54) PATH SELECTION BASED ON ERROR ANALYSIS

(71) Applicant: DELL PRODUCTS L.P., Round Rock, TX (US)

(72) Inventors: Sudharsan Dhamal Gopalarathnam, Chennai (IN); Premnath Sundarababu, Chennai (IN); Mahesh Manivasagam, Chennai (IN)

(73) Assignee: DELL PRODUCTS LP, Round Rock, TX (US)

( * ) Notice: Subject to any disclaimer, the term of this patent is extended or adjusted under 35 U.S.C. 154(b) by 303 days.

(21) Appl. No.: 14/643,141

(22) Filed: Mar. 10, 2015

(65) Prior Publication Data

US 2016/0269278 A1 Sep. 15, 2016

(51) Int. Cl.
| | |
|---|---|
| *G06F 15/16* | (2006.01) |
| *H04L 12/707* | (2013.01) |
| *H04L 12/26* | (2006.01) |
| *G06F 11/07* | (2006.01) |
| *G06F 11/08* | (2006.01) |
| *H04L 12/709* | (2013.01) |
| *H04L 12/753* | (2013.01) |
| *G06F 11/30* | (2006.01) |

(52) U.S. Cl.
CPC ............ *H04L 45/22* (2013.01); *G06F 11/076* (2013.01); *G06F 11/0709* (2013.01); *G06F 11/08* (2013.01); *H04L 43/0847* (2013.01); *G06F 11/3041* (2013.01); *G06F 2201/88* (2013.01); *H04L 43/16* (2013.01); *H04L 45/245* (2013.01); *H04L 45/48* (2013.01)

(58) Field of Classification Search
CPC ..... H04L 45/22; H04L 43/0847; H04L 43/16; H04L 45/48; H04L 45/245; G06F 11/08; G06F 11/0709; G06F 11/076; G06F 11/3041; G06F 2201/88
See application file for complete search history.

(56) References Cited

U.S. PATENT DOCUMENTS 4,490,817 A * 12/1984 Turner ................. H04L 1/0083
370/244
6,892,336 B1 * 5/2005 Giorgetta ............. H04L 1/0043
714/704

(Continued)

OTHER PUBLICATIONS

Gross, Kenny C. et al., "Time-series investigation of anomalous CRC error patterns in fibre channel arbitrated loops," RAS Computer Analysis Laboratory, Sun Microsystems, Inc.

*Primary Examiner* — Krisna Lim
(74) *Attorney, Agent, or Firm* — North Weber & Baugh LLP

(57) ABSTRACT

Embodiments of the present invention include systems and methods for optimizing data flow in a network. The system for distributing data flow in a network includes a controller that receives, from a set of nodes coupled through the network, information of errors at the ports of each node through an input-output (IO) port. The controller compiles the information of errors to assign credits to links coupled to the ports; determines, based on the credits, how to distribute data flow in the network; generates a control signal for controlling the ports; and sends the control signal to the set of nodes through the IO port. The set of nodes controls the ports according to the control signal.

20 Claims, 4 Drawing Sheets

(56) References Cited

U.S. PATENT DOCUMENTS

| | | | | |
|---|---|---|---|---|
| 6,973,602 | B1* | 12/2005 | Fung | H04L 1/203 |
| | | | | 714/704 |
| 8,645,566 | B2* | 2/2014 | Anderson | H04L 29/06027 |
| | | | | 709/230 |
| 9,172,600 | B1* | 10/2015 | Vora | H04L 41/0668 |
| 2006/0007905 | A1* | 1/2006 | Yach | G06F 11/0742 |
| | | | | 370/342 |
| 2014/0325038 | A1* | 10/2014 | Kis | H04L 41/0803 |
| | | | | 709/220 |
| 2016/0085619 | A1* | 3/2016 | Iyer | G06F 11/1004 |
| | | | | 714/807 |

* cited by examiner

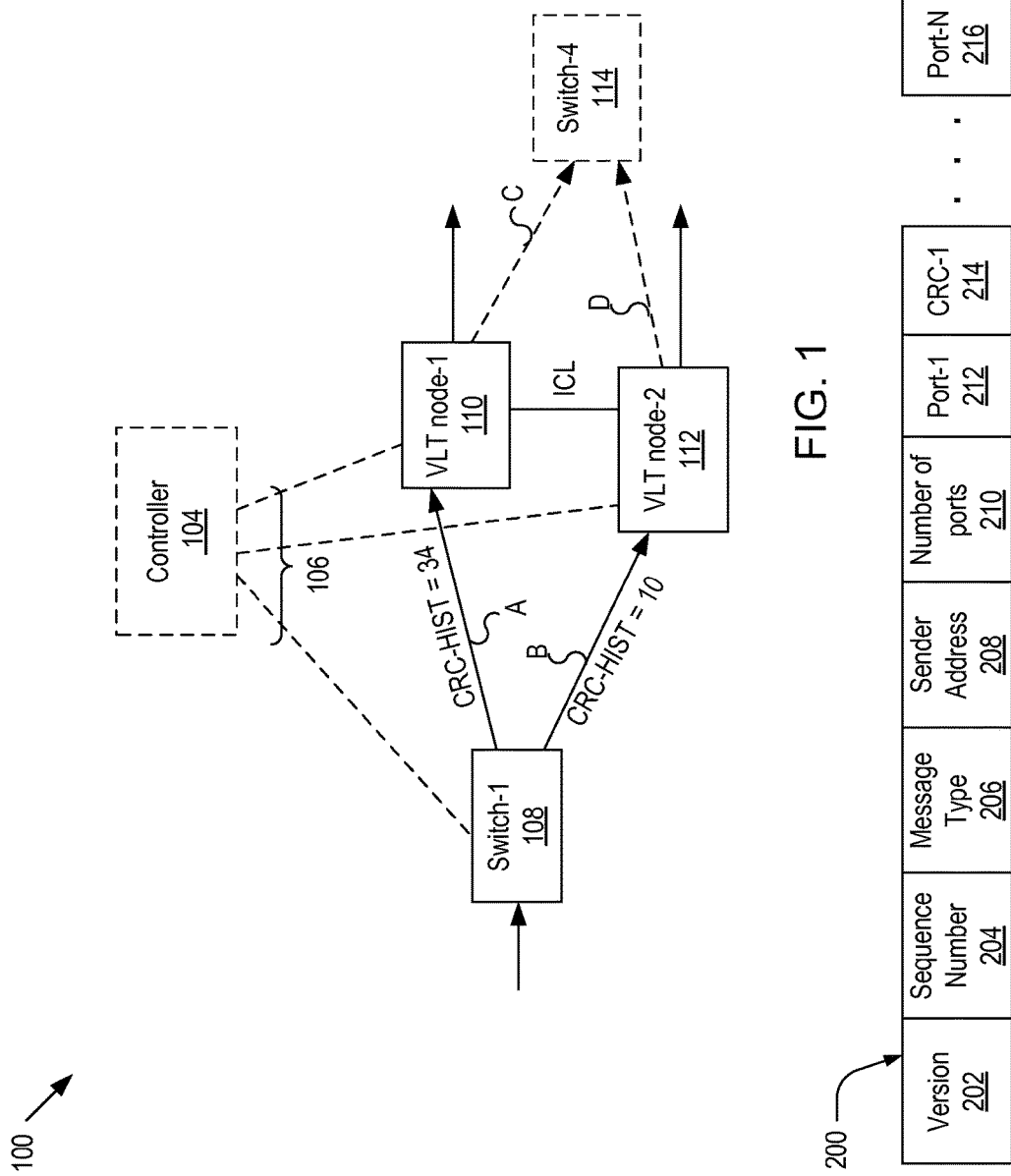

PATH SELECTION BASED ON ERROR ANALYSIS

A. Technical Field

The present invention relates to distributing data flow in a network communication, more particularly, to systems and methods for analyzing various types of errors and distributing data flow among paths based on the analysis.

B. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In general, various types of errors, such as cyclic redundancy code (CRC) error or physical layer (phy) error, may occur during data transmission through the conventional network systems. For instance, a cyclic redundancy code or cyclic redundancy check (CRC) error occurs in a network due to various reasons, such as improper pre-emphasis settings, duplex mismatch, temperature variations, signal degradations and other hardware issues.

When such an error occurs, the corresponding data may be discarded either at the ingress or egress of a port, causing loss of the data during transmission. As such, there is a need for systems and methods that can redirect the data packets to avoid the paths that are prone to errors, to thereby reduce the loss of data during data transmission through the network systems.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 1 ("FIG.") shows a schematic diagram of a network having a virtual-link-trunking (VLT) topology according to embodiments of the present invention.

FIG. 2 shows a schematic diagram of a data sequence generated by a switch according to embodiments of the present invention.

DETAILED DESCRIPTION OF THE PREFERRED EMBODIMENTS

Figure 3:
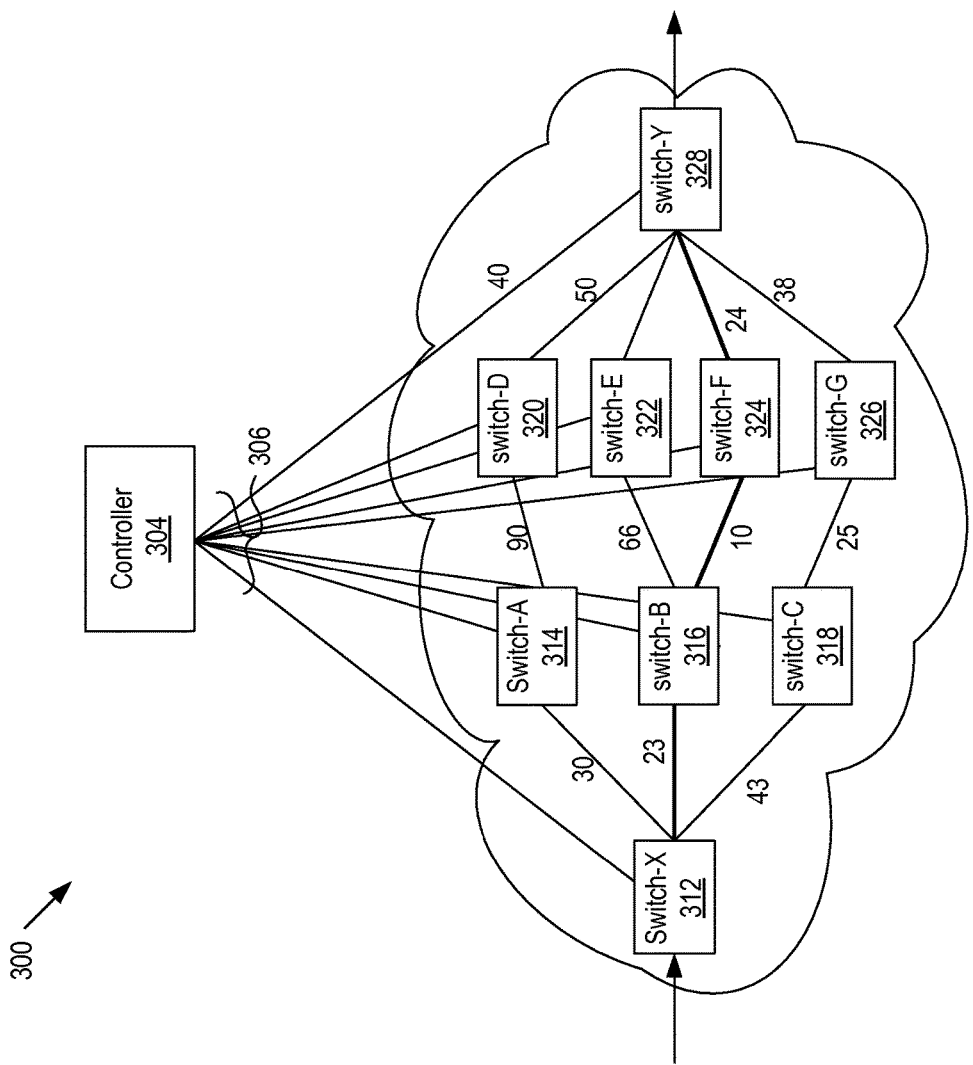
FIG. 3 shows a schematic diagram of a network having an equal-cost-multi-path (ECMP) topology according to embodiments of the present invention.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or nodes. Components may be implemented in software, hardware, or a combination thereof.

Furthermore, connections between components/nodes/switches within the figures are not intended to be limited to direct connections. Rather, data between these components may be modified, re-formatted, or otherwise changed by intermediary components. Also, additional or fewer connections may be used. It shall also be noted that the terms "coupled" "connected" or "communicatively coupled" shall be understood to include direct connections, indirect connections through one or more intermediary devices, and wireless connections.

Furthermore, one skilled in the art shall recognize: (1) that certain steps may optionally be performed; (2) that steps may not be limited to the specific order set forth herein; and (3) that certain steps may be performed in different orders, including being done contemporaneously.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

Embodiments of the present invention presented herein will be described using virtual link trunking (VLT) terminology. These examples are provided by way of illustration and not by way of limitation. One skilled in the art shall also recognize the general applicability of the present inventions to other applications and to other similar technologies that are called by different names. For example, a number of different vendors have implemented their own versions or VLT or VLT-like technologies. For example, Dell Force 10 markets Virtual Link Trunking (VLT). Cisco markets EtherChannel and Port Aggregation Protocol (along with its related Virtual Switching System (VSS), virtual PortChannel (vPC), Multichassis EtherChannel (MEC), and Multichassis Link Aggregation (MLAG)). Avaya markets Multi-Link Trunking (MLT), Split Multi-Link Trunking (SMLT), Routed Split Multi-Link Trunking (RSMLT), and Distributed Split Multi-Link Trunking (DSMLT). ZTE markets "Smartgroup" and Huawei markets "EtherTrunks." Other vendors provide similar offerings. A standard for this technology is under development in the IEEE 802.1 standards committee; the project is called distributed resilient network interconnect (DRNI). Accordingly, references to VLT herein may be read generally as any similar aggregation/multipathing technology.

Layer 2 Cases:

FIG. 1 shows a schematic diagram of network 100 having a virtual-link-trunking (VLT) topology according to embodiments of the present invention. As depicted, the terminating switch, switch-1, 108 is connected to two VLT nodes 110 and 112 to form a VLT topology. In embodiments, the VLT topology may have a dual brain multi-chassis link-aggregation (LAG) feature and a control plane mechanism to provide layer-2 multipathing between access network devices (such as, switches or servers) and core network. The two VLT nodes 110 and 112 may be independent L2/L3 switches or routers for devices in the upstream network and connected to each other via inter-node link, such as interconnect-link (ICL).

For brevity, only two VLT nodes 110 and 112 are shown in FIG. 1. However, the VLT topology may have any other suitable number of nodes coupled to the terminating switch-1 108. For the purpose illustration, the VLT nodes 110 and 112 are described as switches, even though other suitable electrical device, such as routers, may be used in place of switches. Since the switches 108, 110, and 112 may be any suitable electronic devices that can transmit data to other nodes in the network 100, the terms switch and node are used interchangeable hereinafter.

In embodiments, the switch-1 108 may have multiple ports and a monitor module, such as counter, that can monitor the errors (for instance, it can count the number of errors) that occur between the ports and VLT nodes, where the errors may be CRC and/or phy errors and cause loss of data packets during data transmission. (For the purpose of illustration, the term CRC error is used throughout the specification. However, it should be apparent to those of ordinary skill in the art that any other suitable error may be detected and analyzed in place of the CRC error.)

In embodiments, the switch-1 108 may identify links (or connections) with number of CRC errors greater than a preset threshold during each preset time interval. Then, the switch-1 108 may assign a credit to each link (or connection) at the end of each preset time interval (or, equivalently cycle) based on the number of CRC errors so that the higher credit means more frequent occurrence of CRC errors in the link. In embodiments, the credits may be accumulated over cycles and used to identify better paths for transmitting data, where this approach to distribute the data flow is referred to as a historical analysis. For instance, the first port of the switch-1 108 may be connected to the VLT node-1 110 via the link (or route) A and the credit, CRC_HIST, may be 34, while the second port of the switch-1 108 may be connected to the VLT node-2 112 via the link (or route) B and the credit may be 10.

When one of the links in the VLT topology is detected to have a high credit, a load balancing technique may be applied to newly arriving data, causing the transmission load to be skewed in such a manner that links with lower credit are preferred. In embodiments, the switch-1 108 may use hardware features, such as dynamic load balancing (DLB), that is available in a chipset included in the switch-1 108, where the optimal member register of the chipset may be programmed regularly using software. For instance, the register may be programmed so that, the switch-1 108 may prefer the link B than link A since the link B has the lower credit.

In embodiments, the controller 104 is an optional element when the switch-1 108 is able to monitor the CRC errors, perform the historical analysis of the CRC errors and determine how to distribute the data flow among the VLT nodes 110 and 112. In embodiments, a VLT node, say 110, may exchange the CRC error information directly to a peer VLT node, say 112, using link-layer-discovery-protocol (LLDP) or link-aggregation-control-protocol (LACP) extension.

In embodiments, the switch-1 108 may be able to monitor the CRC errors, but may not have the capability to perform the historical analysis or assign credits. In such a case, the switches 108, 110, and 112 may be coupled to a central controller (or shortly controller) 104, such as software-defined networking (SDN) controller, via lines 106. One or more of the switches 108, 110, and 112 may monitor CRC errors that occur at the ports and send the error information to the controller 104. FIG. 2 shows a schematic diagram of a data sequence 200 generated and sent by a switch according to embodiments of the present invention. As depicted, the data sequence 200 may include version 202 that indicates the version number of the message, sequence number 204 that indicates sequence id which is used to uniquely identify the sequence and avoid duplicates, message type 206 that indicates the type of error it contains, such as CRC or any other phy error types, sender address 208 that indicates the IP address of the switch, number of ports 210 that indicates the total number of ports in the switch, port-1 212 that indicates the first port of the switch, CRC-1 214 that indicates the number of CRC errors at the first port during a cycle, . . . , port-N 216 that indicates the N-th port of the switch, and CRC-N 218 that indicates the number of CRC errors at the port-N during a cycle.

It should be apparent to those of ordinary skill in the art that the data sequence 200 may include only a portion of the data fields 202-218 and/or other additional suitable data fields. In embodiments, each switch may send the data sequence 200 to the controller 104 using a time-length-value (TLV) with unique sequence numbers at the end of each cycle. In embodiments, the switches may send error information using other suitable techniques, such as link-layer-discovery-protocol (LLDP), single-network-management-protocol (SNMP) or SFLOW.

In embodiments, upon receiving the data sequence 200 from the switches 108, 110, and 112, the controller 104 may identify links with number of errors greater than a preset threshold or a global average at each cycle. Then, the controller 104 may assign a credit to each link at each cycle based on the number of errors so that higher credit indicates more frequent occurrence of errors in the link. In embodiments, the credits may be accumulated over cycles and the controller 104 may use the credits as one factor in making decisions on how to distribute the data flow among the VLT nodes and to identify better paths for transmitting data. Upon making decisions, the controller 104 may send signals to one or more of the switches 108, 110, and 112 through the lines 106 to control the switches.

In embodiments, the controller 104 is connected to switches when another switch, switch-4 114, is connected to both switches 110 and 112, as indicated by the broken lines. In such a case, the switch-1 108 may transmit data through one or more of the multiple paths (i.e., switch-1→VLT node-1→switch-4, and switch-1→VLT node-2→switch-4). Since the switch-1 108 may not have credit information of the links C and D, the switch-1 108 may not be able to determine how to distribute the data flow among the multiple paths. As such, the controller 104 may perform the historical analysis and distribute the data flow among the multiple paths.

STP Cases:

In embodiments, a switch may be included in an Ethernet local area network (LAN) and operate on spanning-tree-protocol (STP), where the basic function of the STP may include preventing bridge loops and the broadcast radiation that results from them. In such a case, a particular threshold limit of errors may be configured for each port of the switch.

In embodiments, a switch in an LAN may have a STP function, i.e., the switch may change the STP state of each port. In such a case, the switch may monitor the CRC errors and perform the historical analysis of errors. When the threshold limit for a port is breached, the switch may change the STP state of the port from active to blocked to thereby prevent transmitting data through the port and any current blocked port by STP protocol can be made the active port.

In embodiments, an STP switch in an LAN may be able to monitor CRC errors, but may not be able to perform historical analysis or assign credits. In such a case, the switch (and other switches) may be coupled to a central controller, such as SDN controller, and send the information of monitored errors to the controller so that the controller may make decision on how to distribute the data flow among the links. Then, a controller may send a control signal to each switch so that the STP states of the ports of the switch are controlled.

The CRC errors may occur due to the temperature increase of an equipment associate with a link. In such a case, the port corresponding to the link may be blocked to thereby stop transmitting data therethrough until the equipment may return the temperature decreases) to its normal operational condition. If the CRC errors occur due to a faulty hardware, the corresponding port may be kept in the blocked state. In embodiments, by correlating the temperature variation with CRC errors, it may be possible to determine the reasons for the CRC errors. If the CRC error is due to the faulty hardware, the controller may inform the system administrator of the faulty hardware.

Equal-Cost-Multi-Path (ECMP) Cases:

FIG. 3 shows a schematic diagram of a network 300 having an equal-cost-multi-path (ECMP) topology according to embodiments of the present invention. The network 300, which works at Layer 3, is similar to the network 100, with the difference that network 300 may have multiple paths between the first switch, switch-X 312 and the second switch, switch-Y 328. In embodiments, each of the switches 312-328 in the network 300 may be a layer 3 switch, monitor CRC errors, and send the information of errors to the controller 304 via the lines 306. In embodiments, the border-gate-protocol (BGP) may be used to communicate data between the switches 312-328 and the controller 304.

In embodiments, the switch-X 312 may not have the credit information of links between other switches and thus, cannot select the optimum path for data flow from the switch-X 312 to the switch-Y 328. As such, using the error information sent by the switches, the controller 304 may perform historical analysis of the CRC errors and assign a credit to each link. For instance, the link between the switch-X 312 and the switch-A 314 has a credit of 30, while the link between the switch-A 314 and the switch-D 320 has a credit of 90. Based on the credit information, the controller 304 may select an optimum path for transmitting data from one switch to another and/or distribute the data flow among the multiple paths between the switches. When the controller 304 selects a path for data flow from the switch-X 312 to the switch-Y 328, the controller 304 may give less preference to a path having the link between the switch-A 314 and switch-D 320 since this link has the highest credit. In embodiments, to select the optimum path between two switches, the controller 304 may calculate the total credit for each path between the switches and select the path having the lowest a credit. In the present example, the controller 304 may give more preference to a path from the switch-X 312→switch-B 316→switch-F 324→switch-Y 328 than the other paths.

In embodiments, the historical analysis discussed in conjunction with FIG. 3 may be used to redirect incoming lossless traffic, which is a particular class of traffic, to better paths. The losses/drops of data during transmission due to CRC errors may affect the lossless characteristics and, as such, the links having high credits would be avoided when transmitting lossless traffic through the network 300. In embodiments, each switch in the network 300 may include a buffer for storing lossless data queues and an access-control-list (ACL) rule for specifying ports for data transmission. The controller 304 may send control signals to the switches 312-328 via the lines 306 so that the lossless data queues stored in the buffers may be redirected to links that are less prone to errors according to the ACL rule.

Figure 4:
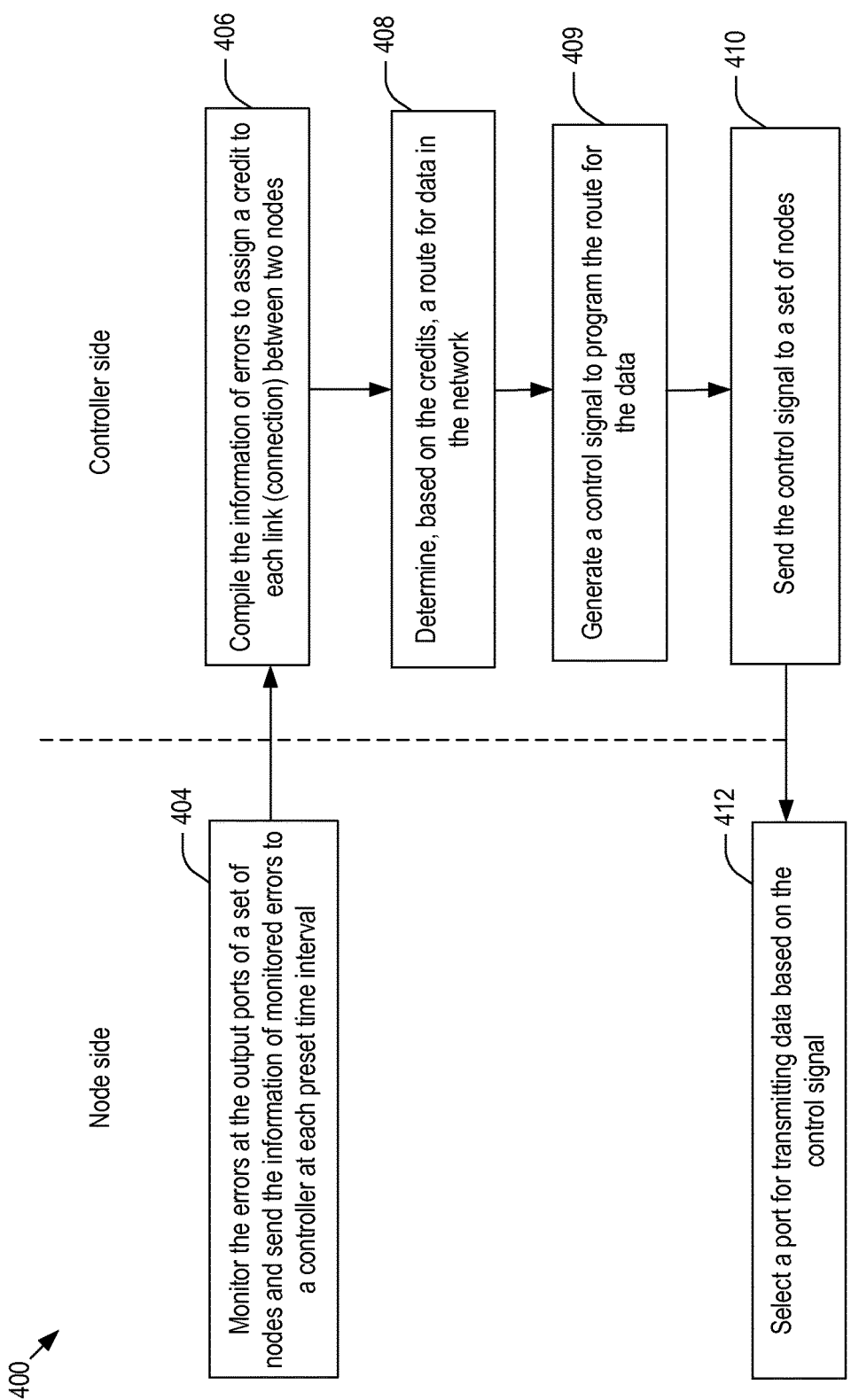
FIG. 4 shows a flowchart of an illustrative process for transmitting data flow in the ECMP topology of FIG. 3 according to embodiments of the present invention.

FIG. 4 shows a flowchart of an illustrative process 400 for transmitting data in the network 300 according to embodiments of the present invention. As depicted, steps 404 and 412 on the node side are performed by one or more nodes (or switches), while steps 406, 408, 409, and 410 are performed by the controller 304. The process 400 starts at step 404. At step 404, each switch may monitor CRC errors that occur at its ports and send the information of errors, such as CRC error counts, to the controller 304. In embodiments, each switch may send the information at each preset time interval (or cycle) on a regular basis, where the information may be included in a suitable data sequence, such as the data sequence 200 in FIG. 2, or in other suitable protocol, such as border-gate-protocol (BGP). Then, at step 406, the controller 304 compiles the information to assigns a credit to each link (or connection) between two switches at each cycle. Next, at step 408, the controller 304 may determine, based on the credits, a route for data in the network. In embodiments, the controller 304 may perform historical analysis of the CRC errors, i.e., the controller 304 may accumulate the credits over a set of cycles and use the accumulated credits to determine how to distribute data among multiple paths. In embodiments, a dynamic-load-balancing technique may be used to determine the distribution.

Then, at step 409, the controller 304 may generate a control signal to program the route for the data, i.e., the control signal is used to control the ports of the switches according to the route. At step 410, the controller 304 may send a control signal to a set of switches. Then, at step 412, each switch may select a port(s) for transmitting data based on the control signal. In embodiments, a switch may have a buffer for storing the incoming data and ACL rules and apply the ACL rule to select a port to transmit each data in the buffer.

As discussed above, the network 100 may include the controller 104 that is similar to the controller 304. In such a case, the switches and controller in the network 100 may perform the steps similar to those of the flowchart 400 to thereby reduce the impact of CRC errors on the data transmission through the network 100. In embodiments, the credit for each link may be determined at each cycle and, as a consequence, the quality of each link may be determined at each cycle, providing a method for checking the quality of each link on a realtime basis.

For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 5:
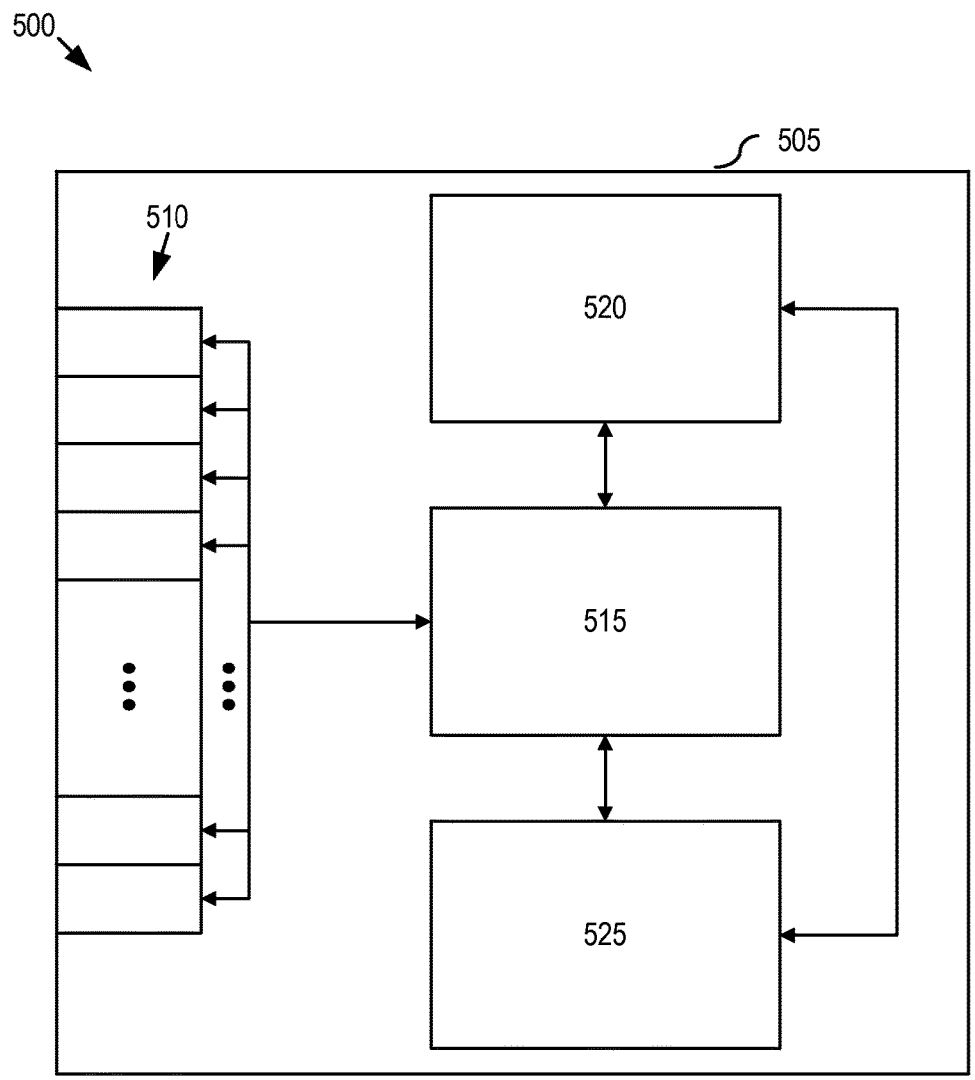
FIG. 5 shows an information handling system according to embodiments of the present invention.

FIG. 5 depicts a simplified block diagram of an information handling system 500 according to embodiments of the present invention. It will be understood that the functionalities shown for device 505 may operate to support various embodiments of an information handling system (or node)—although it shall be understood that an information handling system may be differently configured and include different components. The device 505 may include a plurality of I/O ports 510, a network processing unit (NPU) 515, one or more tables 520, and a central processing unit (CPU) 525. The system includes a power supply (not shown) and may also include other components, which are not shown for sake of simplicity.

In embodiments, the I/O ports 510 may be connected via one or more cables to one or more other network devices or clients. The network processing unit (NPU) 515 may use information included in the network data received at the device 505, as well as information stored in the tables 520, to identify a next hop for the network data, among other possible activities. In embodiments, a switching fabric then schedules the network data for propagation through the device to an egress port for transmission to the next hop.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. An information handling system for distribute data in a network, comprising:
    a plurality of ports for facilitating communications with a plurality of devices communicatively coupled to the information handling system;
    a monitor module communicatively coupled to one or more processors that monitors error information regarding errors that occur on at least some of the plurality of ports; and
    the one or more processors, communicatively coupled to the plurality of ports and communicatively coupled to the monitor module, that receive the error information from the monitor module and direct data to a port selected using at least some of the error information.

2. An information handling system as recited in claim 1, wherein one of the errors is a cyclic redundancy check (CRC) error or a physical layer error.

3. An information handling system as recited in claim 1, wherein the monitor unit counts the errors at the plurality of ports in a preset time interval and, based on counts of the errors, the processor assigns a credit to each of at least some of connections that are associated with corresponding ports.

4. An information handling system as recited in claim 3, wherein a port is blocked when the credit associated with a corresponding connection reaches a preset threshold limit.

5. An information handling system as recited in claim 3, wherein, for each path in the network, a sum of the credits along the path is calculated and the data is sent through a path where the sum is minimum.

6. An information handling system as recited in claim 1, wherein each of the plurality of ports is coupled to a link aggregation group (LAG) node and the system is a terminating switch.

7. An information handling system as recited in claim 6, wherein the link aggregation group (LAG) node communicates with another LAG node via a link.

8. An information handling system as recited in claim 1, wherein the system is a switch in a spanning-tree-protocol (STP) topology or an equal-cost-multi-path (ECMP) topology.

9. An information handling system as recited in claim 1, wherein the system is coupled to a controller via a line and the one or more processors are configured to send the error information to the controller and receive a control signal for controlling the plurality of ports from the controller via the line.

10. An information handling system as recited in claim 9, wherein, based on the error information, the controller is configured to assign a credit to each of at least some of connections that are associated with corresponding ports.

11. A controller for distributing data in a network and performing the steps comprising:
   receiving, from each of a set of nodes coupled through a network, error information regarding errors occurring in connections between devices, each connection being associated with corresponding ports of devices;
   compiling the error information to assign a credit to each of at least some of the connections between devices;
   considering at least one of the credits when determining a route for data in the network;
   generating one or more control signals to program the route for the data; and
   sending the one or more control signals to one or more nodes to route the data.

12. A controller as recited in claim 11, wherein the error information from a particular one of the set of nodes comprises error counts at one or more ports of the particular node.

13. A controller as recited in claim 11, wherein one of the errors is a cyclic redundancy check (CRC) error or a physical layer error.

14. A controller as recited in claim 11, wherein one of the set of nodes is included in a link aggregation group (LAG) topology, a spanning-tree-protocol (STP) topology, or an equal-cost-multi-path (ECMP) topology.

15. A controller as recited in claim 11, wherein a particular port is blocked when the credit associated with a connection that corresponds to the particular port reaches a preset threshold limit.

16. A controller as recited in claim 11, wherein, for each path in the network, a sum of the credits along the path is calculated and the data is sent through a path where the sum is minimum.

17. A computer-implemented method for distributing data in a network, comprising:
   receiving, from each of a set of nodes coupled through a network, error information regarding errors occurring in connections between devices, each connection being associated with corresponding ports of devices;
   compiling the error information to assign a credit to each of at least some of the connections between devices;
   considering at least one of the credits when determining a route for data in the network;
   generating one or more control signals to program the route for the data; and
   sending the one or more control signals to one or more nodes to route the data.

18. A computer-implemented method as recited in claim 17, wherein the error information from a particular one of the set of nodes comprises error counts at one or more ports of the particular node.

19. A computer-implemented method as recited in claim 17, wherein one of the errors is a cyclic redundancy check (CRC) error or a physical layer error.

20. A computer-implemented method as recited in claim 17, wherein one of the set of nodes is included in a link aggregation group (LAG) topology, a spanning-tree-protocol (STP) topology, or an equal-cost-multi-path (ECMP) topology.

* * * * *